Patented Nov. 1, 1949

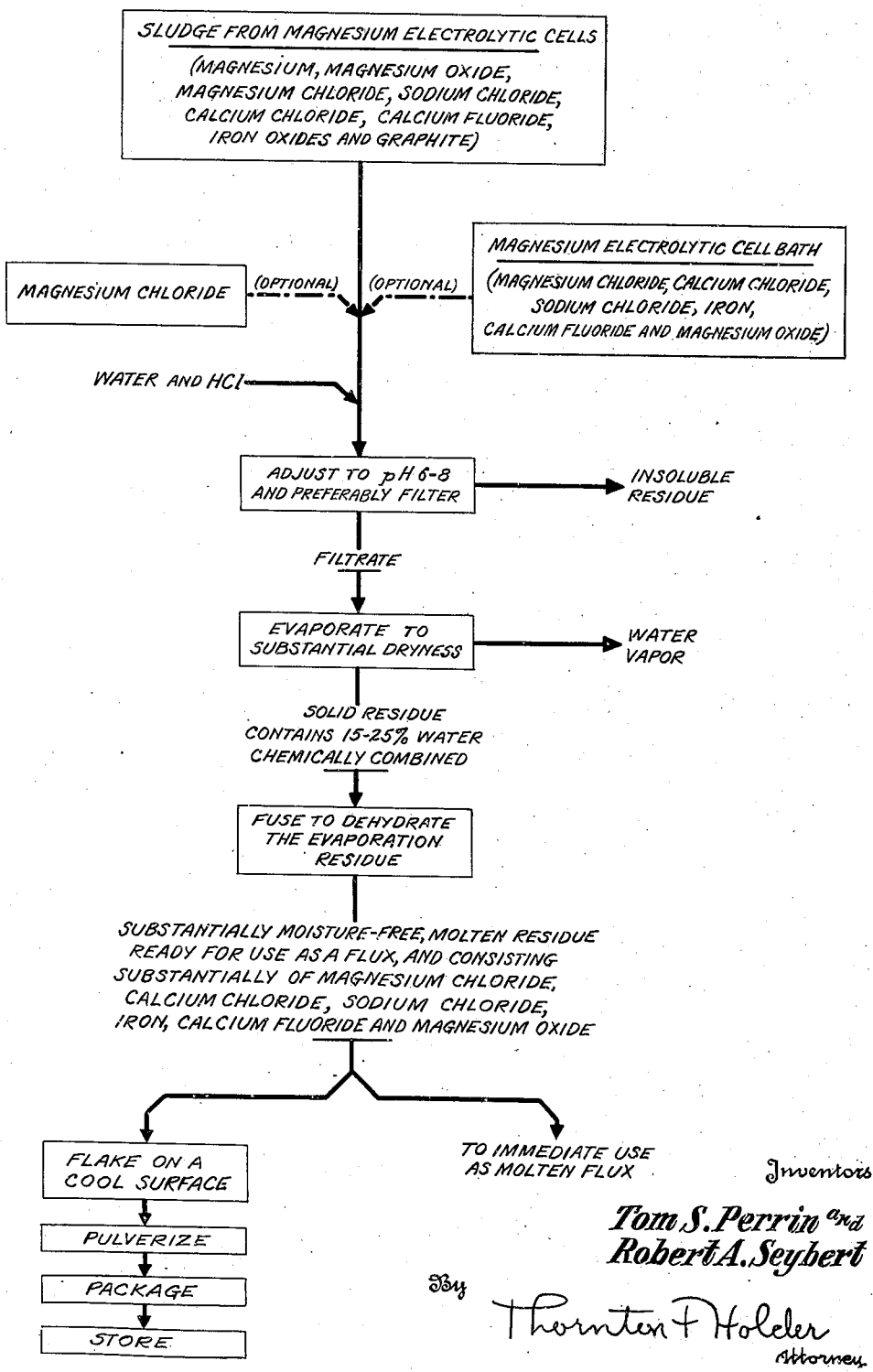

2,486,433

UNITED STATES PATENT OFFICE 2,486,433

PRODUCTION OF FLUX FOR MAGNESIUM AND MAGNESIUM BASE ALLOYS

Tom S. Perrin, Painesville, Ohio, and Robert A. Seybert, United States Army, assignors to Diamond Alkali Company, Cleveland, Ohio, a corporation of Delaware Application April 6, 1945, Serial No. 587,020

2 Claims. (Cl. 75—67)

This invention relates generally to the production and processing of magnesium and is particularly concerned with a new and improved method of preparing a refining and casting flux for magnesium and magnesium base alloys.

In manufacturing magnesium and its alloys and in fabricating articles therefrom it is often necessary to liquefy the metal and handle and treat it in that condition. Owing to the very reactive nature of molten magnesium and its strong affinity for oxygen, means of insulating the hot metal from oxygen- and moisture-containing gases are essential to prevent its oxidation or burning. For this purpose fluxes such as magnesium chloride and the mineral carnallite (potassium chloride and magnesium chloride) have been employed. At present and for about 20 years the many experimentally developed synthetic fluxes which are desirably readily separable from molten magnesium, whereas magnesium chloride and carnallite are not, and which are effective in protecting the metal and removing therefrom oxides, chlorides, nitrides and other impurities, have been generally employed. Although the compositions of these fluxes vary widely, their melting points and viscosities at temperatures encountered in magnesium and magnesium base alloy melts are uniformly about the same, and most of them contain magnesium chloride as a basic constituent.

When these synthetic compositions became available, they were generally used because they were more economical than the theretofore exclusively-used magnesium chloride and carnallite which were less expensive to buy. With improved production methods and the development of new and less expensive mixtures, flux costs have been decreased but remain in excess of magnesium chloride and carnallite costs. As a result of our discovery that suitable fluxes can easily and simply be produced from magnesium electrolytic cell wastes, flux costs can for the first time be brought to less than either magnesium chloride or carnallite.

Briefly, the process of our invention consists of mixing the sludge of magnesium electrolytic cells with water acidified with hydrogen chloride, separating uncombined water from the mixture, and anhydrizing the resulting solids through fusion.

Carrying out the present process in the manner in which we prefer to practice it, sludge obtained from the magnesium electrolytic cells, consisting essentially of magnesium, magnesium oxide, magnesium chloride, sodium chloride, calcium chloride, calcium fluoride, iron oxides and graphite, is mixed with water containing hydrogen chloride. This may suitably be accomplished by mixing the sludge with water and thereafter adding hydrochloric acid. Alternatively, where it is not desirable or convenient to absorb hydrogen chloride gas from the magnesium electrolytic cells in water, the sludge may be mixed with the requisite quantity of water and gaseous hydrogen chloride may then be brought into the aqueous mixture until the pH of said mixture reaches a pre-determined, satisfactory value. In any case, however, substantially all the sludge should, for reasons of economy, be dissolved in the aqueous medium if a separation of insolubles from said medium is to follow.

Using sludge pieces of an average size of about ¾ inch and only sufficient water to dissolve said sludge, the dissolving operation is customarily accomplished within about four to five hours with moderate mechanical agitation of the aqueous medium. Mixture temperature has substantially no effect upon the rate of dissolving because sodium chloride, the least soluble of the soluble sludge constituents, is soluble to about the same extent in freezing as in boiling water.

We have found that about 3.7 parts of water per part of an average sludge are required to dissolve substantially all the water-soluble constituents thereof, including the magnesium and magnesium oxide converted by hydrochloric acid to water soluble form in the following manner:

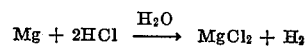

$$Mg + 2HCl \xrightarrow{H_2O} MgCl_2 + H_2$$

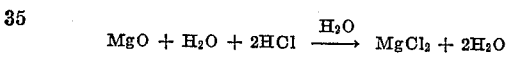

$$MgO + H_2O + 2HCl \xrightarrow{H_2O} MgCl_2 + 2H_2O$$

By the term "average sludge" we mean a magnesium cell sludge of substantially the following approximate composition:

| | Per cent |
|---|---|
| Magnesium chloride | 20 to 30 |
| Sodium chloride | 30 |
| Calcium chloride | 12 to 17 |
| Calcium fluoride | 1½ |
| Magnesium oxide | 18 to 23 |
| Magnesium | 6 to 15 |
| Oxides of iron | 0 to 4 |
| Graphite | Considerable |

More than the minimum of water may be employed in this step, but since in a subsequent operation the material here being dissolved is to be more or less thoroughly dehydrated, we provide only a slight excess over the minimum requirement to assure efficient leaching of the waterand dilute hydrochloric acid-solubles of the sludge.

In general, the strength and quantity of hydrochloric acid used in an aqueous medium containing sludge of the foregoing type is not critical so long as the pH of said medium is finally fixed at less than about 8 thus assuring conversion and leaching of substantially all magnesium and magnesia of the slude. But since and excess of hydrogen chloride leads to contamination of the final product with pigmenting iron compounds, we prefer to adjust the pH to between about 6 and about 8 and make a separation of solids from liquid under that condition while the oxides of iron remain undissolved. This practice has the further advantage that corrosion of metal vessels and other equipment coming into contact with the resulting substantially solid-free solution with consequent contamination of the final product, is minimized.

Commercial operation of this process may conveniently be conducted by mixing the sludge with hydrochloric acid of sufficient strength to produce a final pH in the aqueous medium of less than about 8, and sufficient water to leach the soluble constituents of said sludge. Only the final pH is important and then only if the aqueous mixture is to be filtered or otherwise treated for solid-liquid separation and iron removal, or if a corrosion problem in subsequent processing of the liquid exists. If a deficiency of acid is used, as reflected by a pH of more than about 8 in the resulting aqueous mixture, conversion and leaching of magnesium and magnesia is incomplete and in the absence of a filtration or equivalent step the product will be inferior or unsuitable for fluxing purposes. If the medium is filtered, a loss of magnesium is suffered and because of that loss the product flux may be deficient in magnesium chloride and useless.

The next step in order is the removal of uncombined water from the substantially solid-free liquid phase, or, if the aqueous medium has not been filtered or otherwise treated for solid-liquid separation, the removal of uncombined water from the original aqueous medium containing undissolved portions of sludge. This we have accomplished by simple, open-vessel evaporation technique using conventional equipment and maintaining the liquid at its boiling point temperature under atmospheric pressure. Preferably this evaporation equipment and all other equipment of this process coming into contact with sludge or resulting flux is not readily corroded under conditions of the contact.

The solid residue remaining after evaporation is composed of magnesium chloride and other hygroscopic salts and a not inconsiderable amount of water chemically combined with various constituents of the residue. In addition there may be a small quantity of free water. In the interest of convenience and economy we customarily leave between about 15% and about 25% of water associated with the solids obtained on evaporation, all of which water is chemically combined and none of which is free.

Since flux for molten magnesium is not suitable if it contains substantially any moisture, it is necessary further to dehydrate the evaporation residue. We have found that said dehydration can be accomplished through fusion. Due to the presence of other salts and the fact that the major portion of water is removed during evaporation, magnesium chloride decomposition is not under ordinary circumstances excessive during fusion. According to our preferred practice, the evaporation mass or residue is transferred to a smaller vessel than that employed in the evaporation, but of the same simple, conventional design. Heat is then applied to fuse and thereby anhydrize said residue, which, when liquefied, is substantially moisture-free and suitable for use as a flux. In liquid condition it may be employed as a flux and added directly into a melt of magnesium. Usually, however, such immediate use will be the exception rather than the rule and methods and means of storing will be required. In practice we generally pour the molten flux on a revolving, relatively cool, metal cylinder and scrape it therefrom and thereby produce a solid, flaky product which, when properly pulverized, is easily packaged and stored. In general, we prefer to apply the flux to molten magnesium in pulverized form since under these circumstances, the flux rapidly coats the air exposed surface of the magnesium. Because of the hygroscopic nature of the flux, it advantageously is not exposed to moisture-containing air for protracted periods during and after cooling, especially if it is flaked or pulverized rather than in chunk or massive form. Preferably, it is sealed in an air tight container after solidification while its temperature is somewhat above 100° C.

The flux flakes may be pulverized in any convenient manner entailing a minimum of exposure to the atmosphere and other moisture sources. We have, for example, obtained a satisfactory pulverized product through the use of a conventional hammer mill. Preferably, most of the fines produced are of an average size approximating that of common table salt or granulated sugar since in that form the flux functions efficiently to insulate molten magnesium from oxidizing atmosphere.

By the process of our invention a suitable flux can be produced from certain mixtures of sludge and a material such as typical magnesium electrolytic cell bath having the following approximate composition:

|  | Percent |
|---|---|
| Magnesium chloride | 20 to 30 |
| Calcium chloride | 20 to 30 |
| Sodium chloride | 48 |
| Iron | 2 |
| Calcium fluoride | 1½ |
| Magnesium oxide | 0.2 |

Because of the low ratio of magnesium chloride, actual and potential, in these bath compositions, a flux having the desired properties of melting point and viscosity cannot be obtained by treating such a composition according to our process. But we have found that a mixture containing between about one and about three parts of this bath and about 10 parts of sludge can be converted into a satisfactory flux by the foregoing sludge treating method. If the ratio of bath to sludge is greater than about 3 to 10, the resulting flux will be deficient in magnesium chloride and unsuitable unless another source of magnesium chloride is employed to bring the mixture to the desired composition. We have, for example, produced by our process a flux of desirable properties from mixtures consisting of 10 parts of a typical sludge and between about 3 and about 10 parts of bath and between about 5 and about 1 part, respectively, of shelf-dried magnesium chloride comprised of about 85% magnesium chloride and about 15% water. It will be understood, of course, that with different ratios of sludge to bath and with different grades of sludge and bath, varying amounts of magnesium chloride will be required to fix the resulting flux composition at the proper value. Also, it will be necessary to use varying amounts of a source of magnesium chloride.

Our invention will be better understood by those skilled in the art by the following non-limiting but illustrative examples of the process as we have actually operated it:

Example I

To 85 pounds of magnesium electrolytic cell sludge crushed to egg-size and containing 20% magnesium chloride, 30% sodium chloride, 20% magnesium oxide, 12% magnesium, 16% calcium chloride, 1½% calcium fluoride, ½% iron and in addition a considerable amount of graphite, was added 18 gallons of water. As the resulting mixture was undergoing mechanical agitation furnished by conventional stirring means, 21½ gallons of 19% hydrochloric acid was added to said mixture. After four hours, during which agitation was continued, the mixture was poured from the enamelware mixing vessel into a filter where substantially all the solids were retained while the liquid passed through and was caught below in another enamelware vessel. Gas burners were used to heat this latter vessel and, the solution was dehydrated by evaporation until substantially no free water remained and the material was thick and mushy. It was then transferred to a stainless steel vessel where heating was effected by a continuous blast of gas flame against the vessel walls. The remaining free water, as well as that held by the various hygroscopic salts of the material, was rapidly driven off the material so that by the time the originally solid contents of the vessel melted, they were anhydrous. The anhydrous melt was poured on a stainless steel plate, and cooled and solidified. It was removed as flakes from that plate and pulverized in a hammer mill to an average particle size slightly larger than granulated sugar. The resulting final product had the following composition and was suitable for use as a refining and casting flux for magnesium and magnesium base alloys:

| | Percent |
|---|---|
| Magnesium chloride | 32.1 |
| Calcium chloride | 21.4 |
| Sodium chloride | 27.3 |
| Magnesium hydroxy chloride | 6.78 |
| Magnesium oxide | 8.50 |
| Ferric oxide | 0.84 |
| Calcium fluoride | small but not determined |

Example II

To 10 gallons of an aqueous mixture prepared by adding 43 pounds of a typical magnesium electrolytic cell sludge to 10 gallons of water, adding thereto 42 pounds of 37% hydrochloric acid and making the mixture to a volume of 18 gallons with water, was added one gallon of an 18-gallon water solution of 43 pounds of a typical magnesium electrolytic cell bath. The mixture, after four hours of mechanical agitation by conventional means, was transferred from the enamelware mixing vessel to a filter where substantially all the solids were retained while the liquid passed through and was caught in another enamelware vessel. Gas burners were used to heat this latter vessel and the solution was dehydrated by evaporation until substantially no free water remained and the material was thick and mushy. Said thick material was then transferred to a stainless steel vessel where heating of the material was continued by a continuous blast of gas flame on the vessel walls. The remaining free water, as well as that held by the various hygroscopic salts of the material, was rapidly driven off so that by the time the originally solid contents of the vessel were melted, they were anhydrous. The anhydrous melt was poured on a stainless steel plate, removed therefrom in flake-form and pulverized in a hammer mill to an average particle size slightly larger than granulated sugar. The product had the following composition and was suitable for use as a refining and casting flux for magnesium and magnesium and magnesium base alloys:

| | Percent |
|---|---|
| Magnesium chloride | 27.71 |
| Calcium chloride | 19.60 |
| Sodium chloride | 35.80 |
| Magnesium oxide | 13.36 |
| Calcium fluoride | small |
| Iron | small |

Throughout this specification and in the appended claims wherever composition is specified by percentage, parts, or otherwise, it is with reference to the weight of the composition and not its volume.

Having thus described the present invention so that others may be able to understand and practice the same, we state that what we desire to secure by Letters Patent is defined in what is claimed.

What is claimed is:

1. The process of preparing a refining and casting flux for magnesium and magnesium base alloys from waste materials from magnesium processing, which includes the steps of collecting waste from magnesium electrolytic cells comprising sludge having the approximate composition of about 20 to 30% magnesium chloride, about 30% sodium chloride, between 18% and 23% magnesium oxide, between 6% and 15% magnesium, between 12% and 17% calcium chloride, and smaller amounts of calcium fluoride, iron and graphite, contacting said sludge with aqueous hydrochloric acid in an amount sufficient to establish an ultimate pH of less than about 8, removing undissolved solids from said acid treated system, concentrating the liquid phase of said system to precipitate said dissolved solids, and fusing said precipitated materials to remove water therefrom.

2. The process of preparing a refining and casting flux for magnesium and magnesium base alloys from waste materials from magnesium processing, which includes the steps of collecting magnesium electrolytic cell sludge having the approximate composition of about 20 to 30% magnesium chloride, about 30% sodium chloride, between about 18% and 23% magnesium oxide, between 6% and 15% magnesium, between 12% and 17% calcium chloride, and smaller amounts of calcium fluoride, iron and graphite, combining from one to three parts of magnesium cell bath solution having the approximate composition of 20% to 30% magnesium chloride, 48% sodium chloride, 20% to 30% calcium chloride, and smaller amounts of calcium fluoride, magnesium oxide, and iron with about 10 parts of said sludge, contacting said combination with aqueous hydrochloric acid in an amount sufficient to establish an ultimate pH of less than about 8, removing undissolved solids from said acid treated system, concentrating the liquid phase of said system to precipitate said dissolved solids, and fusing said precipitated materials to remove water therefrom.

TOM S. PERRIN.
ROBERT A. SEYBERT.

REFERENCES CITED

The following references are of record in the file of this patent:

UNITED STATES PATENTS

| Number | Name | Date |
|---|---|---|
| 2,043,960 | Jones et al. | June 9, 1936 |
| 2,372,563 | Emley | Mar. 27, 1945 |
| 2,384,009 | Brandenburg | Sept. 4, 1945 |

FOREIGN PATENTS

| Number | Country | Date |
|---|---|---|
| 548,381 | Great Britain | Oct. 8, 1942 |